United States Patent [19]
Tsuzuki

[11] Patent Number: 5,109,659
[45] Date of Patent: May 5, 1992

[54] MAGNETIC RING FOR THE SPINNING OF TEXTILE YARN AND METHOD

[75] Inventor: Kiyohiro Tsuzuki, Greenville, S.C.

[73] Assignee: TNS Mills, Inc., Blacksburg, S.C.

[21] Appl. No.: 531,524

[22] Filed: Jun. 1, 1990

[51] Int. Cl.⁵ .............................................. D01H 7/56
[52] U.S. Cl. ........................................ 57/66; 57/122; 57/124
[58] Field of Search ................. 57/66, 75, 119, 122, 57/124, 129, 136, 137, 352

[56] References Cited

U.S. PATENT DOCUMENTS

| | | | |
|---|---|---|---|
| 501,427 | 7/1893 | Kent | 57/122 |
| 2,932,152 | 4/1960 | Jackson | 57/66 |
| 3,114,234 | 12/1963 | Kobayashi et al. | 57/124 X |
| 3,122,876 | 3/1964 | Matsui | 57/124 |
| 3,393,502 | 7/1968 | Reeder | 57/75 X |
| 3,785,140 | 1/1974 | Muller | 57/75 X |
| 3,851,448 | 12/1974 | Sairo et al. | 57/75 |

FOREIGN PATENT DOCUMENTS

| | | | |
|---|---|---|---|
| 0359460 | 3/1990 | European Pat. Off. | 57/124 |
| 1185959 | 1/1965 | Fed. Rep. of Germany | 57/124 |
| 0478448 | 1/1953 | France | 57/124 |
| 0075623 | 4/1985 | Japan | 57/122 |
| 1217947 | 3/1986 | U.S.S.R. | 57/124 |
| 0942481 | 1/1961 | United Kingdom | 57/122 |

*Primary Examiner*—Joseph J. Hail, III
*Attorney, Agent, or Firm*—Bailey & Hardaway

[57] ABSTRACT

Textile yarn is fed beneath a permanent magnetic ring (A) to a driven bobbin, wherein a fixed ring (B) carried on a ring rail and having an extension (C) projecting inwardly beneath the permanent magnetic ring provides a physical enclosure about the permanent magnetic ring, which has a complementary peripheral surface. The fixed ring supplies a repulsive magnetic force causing the permanent magnetic ring to float in a maintained centered relation therein. The fixed ring may be comprised of either permanent magnets held in stacked relation by removable clips or electromagnets connected by a hinge.

14 Claims, 2 Drawing Sheets

MAGNETIC RING FOR THE SPINNING OF TEXTILE YARN AND METHOD

BACKGROUND OF THE INVENTION

This invention relates to an improvement in devices and methods utilizing a floating ring in lieu of a traveller in textile ring spinning.

It has long been recognized that the maximum speed at which it is possible to operate a traveller is the upper limit to ring spinning speeds. This limitation in yarn production is a major factor which has lead to the development of alternative spinning processes including open end spinning in particular. However, despite this disadvantage, because of superior yarn characteristics the industry is returning to ring spinning.

Efforts have been made to utilize floating rings under which yarn may be fed from the drafting system for winding upon a bobbin. During this process twist is imparted to the yarn as it is distributed upon the bobbin by the vertical traversing of the ring rail. This important function in ring spinning has been conventionally performed by the traveller. Due to the light weight construction and the geometry of the path which must be traversed, the speeds which may be operationally achieved by the traveller are limited resulting in a limitation in ring spinning output.

Prior efforts to utilize floating rings are exemplified by the disclosures of the following U.S. Pat. Nos.: 2,932,152; 3,114,234; 3,122,876; 3,785,140; and 3,851,448.

U.S. Pat. No. 3,851,448 illustrates a combined utilization of attracting magnetic force and air pressure to maintain a ring floating in a stabilized central location. The use of electromagnet magnetic means results in increased space requirements, and pressurized air is expensive for mill use.

U.S. Pat. Nos. 3,114,234 and 3,122,876 illustrate the use of permanent magnets for positioning floating magnetic rings but appear limited from the standpoint of affording structural support as well as the necessary combination of magnetic forces for proper centering of the floating ring.

U.S. Pat. No. 2,932,152 illustrates the use of air jets for centering the floating ring, while U.S. Pat. No. 3,785,140 illustrates the use of a pierced ring rotated in a stator ring.

Accordingly, it is an important object of this invention to increase ring spinning speeds by providing an improved apparatus for eliminating the traveller.

Another important object of the invention is the provision of a simplified construction of a floating ring wherein an extension of the fixed ring extends beneath the floating ring to aid in start up and to prevent displacement of the floating ring due to gravity.

Another important object of the invention is to provide a fixed ring structure capable of affording adequate control over a floating ring for proper positioning but which affords accessibility for cleaning and replacement.

SUMMARY OF THE INVENTION

It has been found that a textile yarn spinning apparatus and method may be provided wherein yarn is fed beneath the bottom surface of a permanent magnetic ring to a driven bobbin. A fixed ring is carried on a ring rail providing a physical enclosure extending above and below the permanent magnetic ring and has an extension projecting inwardly therebeneath supplying a repulsive or opposing magnetic force which maintains the permanent magnetic ring floating in centered relation therein for imparting a twist to yarn fed thereunder and wound upon the bobbin. Thus, a permanently magnetized ring is carried in floating centered relation within a ring fixed on the ring rail which offers support at the sides and bottom.

BRIEF DESCRIPTION OF THE DRAWINGS

The construction designed to carry out the invention will be hereinafter described, together with other features thereof.

The invention will be more readily understood from a reading of the following specification and by reference to the accompanying drawings forming a part thereof, wherein an example of the invention is shown and wherein.

DESCRIPTION OF A PREFERRED EMBODIMENT

A textile yarn spinning apparatus is illustrated having a driven bobbin and a traversing ring rail for distributing yarn thereon. A floating permanent magnetic ring A is centrally positioned about the bobbin beneath which yarn is fed to the bobbin. A fixed ring B is mounted on the ring rail carrying the floating ring centrally therein. The fixed ring encompasses the floating ring having a portion extending above and below the floating ring. The fixed ring has a lower extension C projecting inwardly beneath a surface of the floating ring. Means are provided on the fixed ring supplying a repulsive magnetic force in respect to the floating ring maintaining the floating ring centrally above the lower extension. Thus, twist is supplied to the yarn which passes between the floating ring and the fixed ring and then beneath the bottom surface of the floating ring for distribution upon the bobbin.

Figure 1:
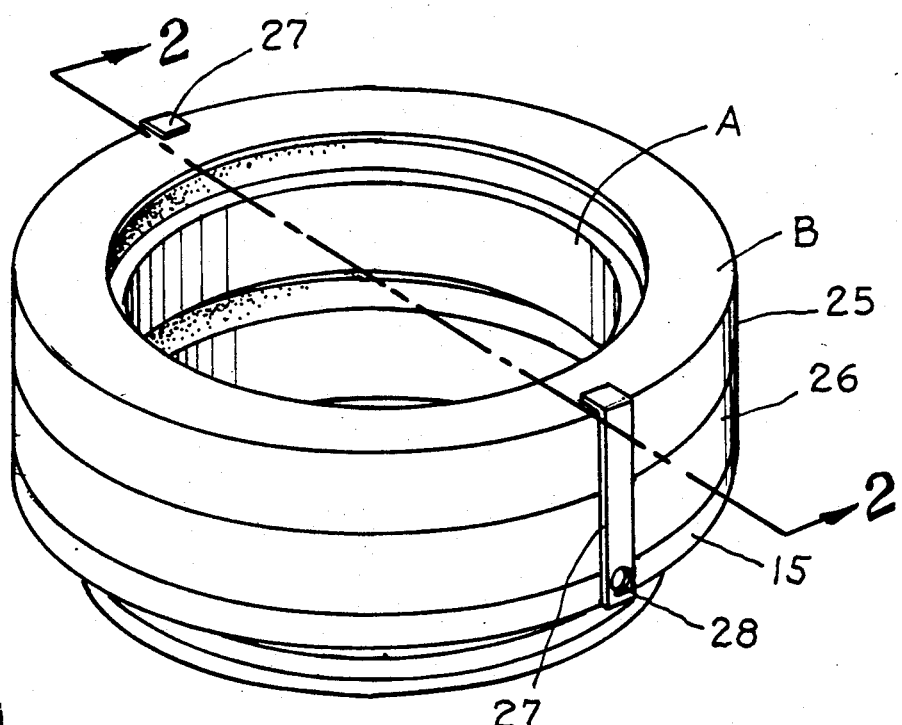
FIG. 1 is a perspective view illustrating a ring construction in accordance with the invention.
Figure 2:
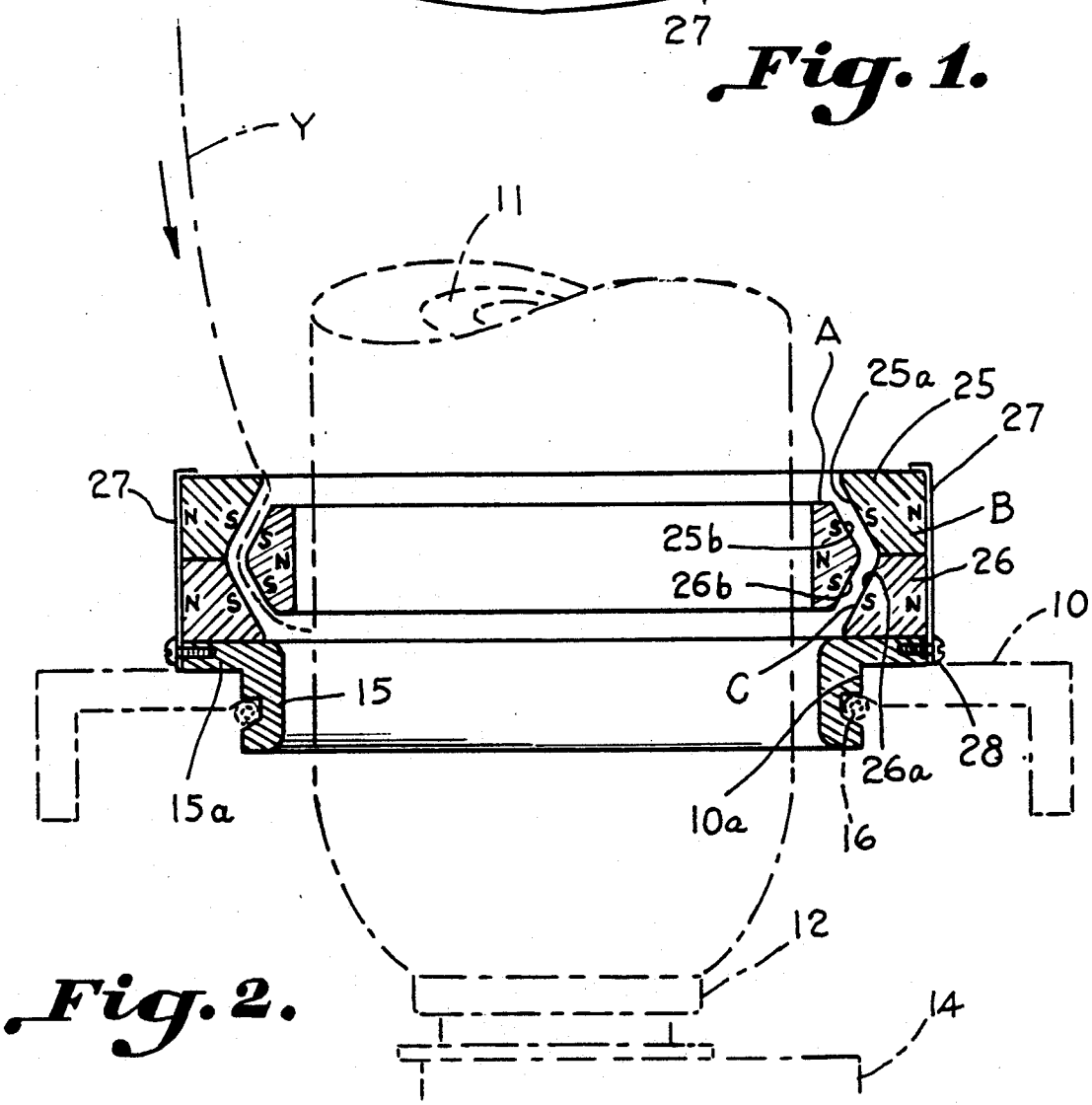
FIG. 2 is a transverse sectional elevation taken on the line 2—2 in FIG. 1.

Referring more particularly to FIGS. 1 and 2, a horizontal ring rail 10 is provided for moving in the usual vertical traversing builder motion for distributing the yarn Y from the drafting system, not shown, upon the bobbin 11. The bobbin 11 is further illustrated as being carried upon a spindle 12 in the usual stationary bolster rail (not shown). The spindle 12 is driven for rotation by the spindle tape 14 to impart rotation to the bobbin 11. Thus, a yarn package is formed or built upon a bobbin in a ring spinning operation.

The ring rail 10 has a series of spaced openings 10a through which the bobbins 11 are centrally located. A ring 15 is shown carried in the opening 10a and provided with a retaining ring 16. The ring 15 has an annular flange 15a which serves as a base support for the fixed ring B. The fixed ring B has a lower integral extension C projecting inwardly beneath a surface of the floating ring A.

It will be noted in FIGS. 1 and 2 that the fixed ring B containing the floating ring A is a permanent magnet having outer and inner surfaces of opposite polarities.

The outer surface is designated as South. The fixed ring B is likewise a permanent magnet wherein an inner portion extending above and below the floating ring A as well as an inner portion of the lower extension C is indicated as being of South polarity. By reason of the repulsive forces exerted by the adjacent opposite surfaces of South polarity, the floating ring A is maintained centrally disposed above the bottom of extension C against the forces exerted by the yarn which move it within the annular groove in the fixed ring B as well as support it against the force of gravity.

FIGS. 1 and 2 illustrate an embodiment of the invention wherein the fixed ring B is constructed from stacked annular magnets 25 and 26 which are secured together by spaced clips 27 secured as by a screw 28 to the base 15a. The magnets 25 and 26 may have varying amounts of magnetism so as to position the floating ring A in a predetermined position. The magnets 25 and 26 have converging surfaces 25a and 26a so as to be substantially frusto-conical respectively forming the annular groove in the fixed ring B. The floating ring A has complementary surfaces 25b and 26b respectively.

Figure 3:
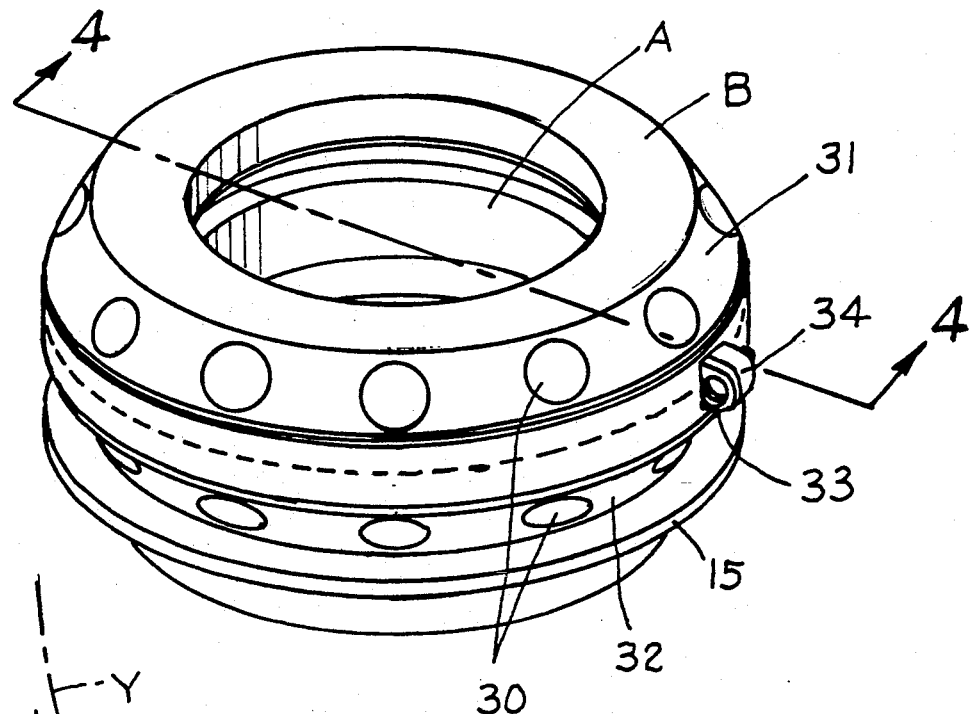
FIG. 3 is a perspective view further illustrating a modified form of the invention.
Figure 4:
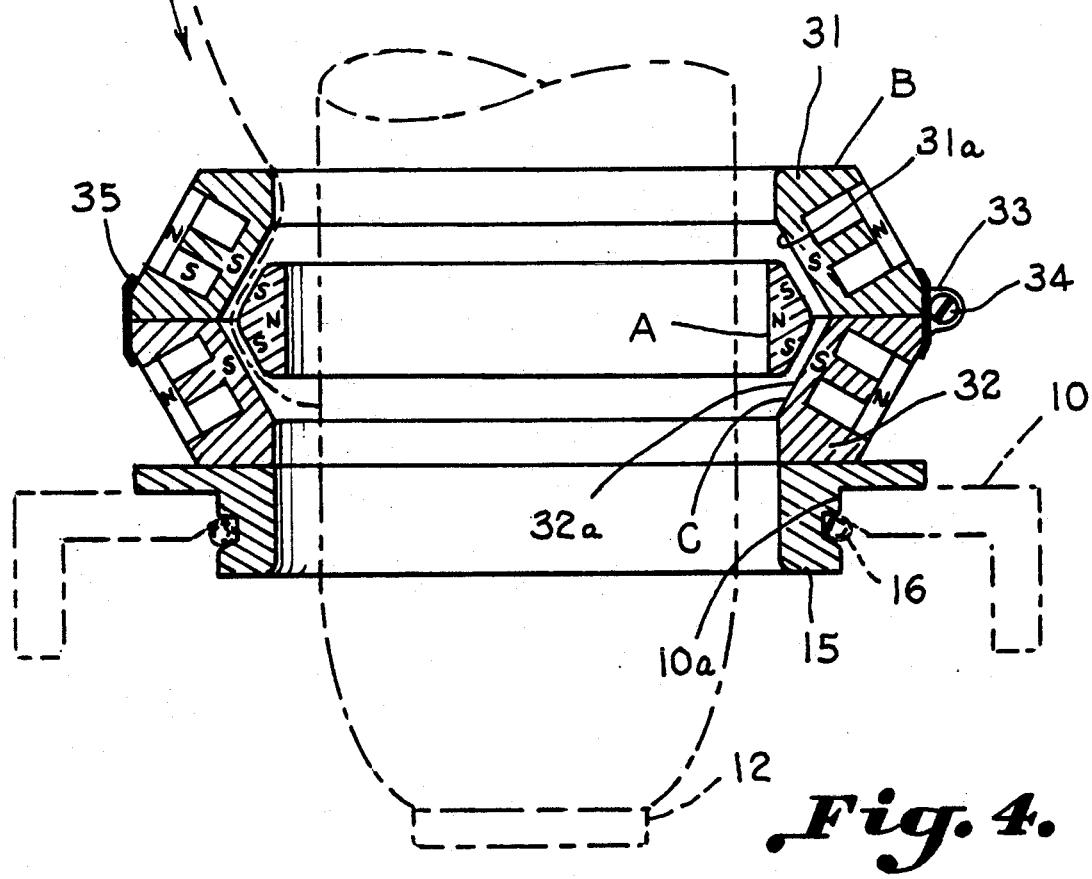
FIG. 4 is a transverse sectional view taken on the line 4—4 in FIG. 3.

FIGS. 3 and 4 illustrate another modified form of the invention wherein circumferentially spaced electromagnets 30 are utilized within the stacked magnetic members 31 and 32. The annular magnetic members 31 and 32 have planar converging annular surfaces 31a and 32a respectively forming the annular groove for the floating ring A, which has surfaces complementary to surfaces 31a and 32a. Means such as variable resistors, not shown, may be provided to vary the magnetic force to retain the floating ring A in a predetermined position. The stacked rings or segments 31 and 32 which form the fixed ring B have a hinged connection 33 with a horizontal pin 34 opposite a latch 35.

It is thus seen that a versatile apparatus has been provided affording a substitute for the traveller in ring spinning. Effective central positioning of the floating ring is achieved as well as accessibility for servicing and for replacement. Several forms of the invention are illustrated offering particular advantages depending upon features desired for special application.

While a preferred embodiment of the invention has been described using specific terms, such description is for illustrative purposes only, and it is to be understood that changes and variations may be made without departing from the spirit or scope of the following claims.

What is claimed is:

1. A textile yarn spinning apparatus having a driven bobbin and a traversing ring rail for distributing yarn thereon comprising:
    a floating permanent magnetic ring centrally positioned about said bobbin beneath which yarn is fed to said bobbin;
    a fixed ring on said ring rail carrying said floating ring centrally therein;
    said fixed ring encompassing said floating ring, having a portion extending above and below said floating ring;
    said fixed ring having a lower extension projecting inwardly beneath a surface of said floating ring; and
    means on said fixed ring supplying a repulsive magnetic force with respect to said floating ring, maintaining said floating ring centrally above said lower extension;
    whereby twist is supplied to the yarn passing between said floating ring and said fixed ring and then beneath a bottom surface of said floating ring for distribution upon said bobbin.

2. The apparatus set forth in claim 1 wherein said floating ring has respective outer and inner surfaces of opposite polarities and said lower extension of said fixed ring having an inner polarity similar to the adjacent portion of outer polarity of said floating ring causing the floating ring to be centered within the fixed ring.

3. The apparatus set forth in claim 2 wherein said fixed ring is a permanent magnet.

4. The apparatus set forth in claim 2 wherein said fixed ring is an electromagnet.

5. The apparatus set forth in claim 2 wherein said fixed ring includes a pair of vertically stacked, separable, annular members.

6. The apparatus set forth in claim 5 wherein said stacked members have respective inner annular surfaces of planar cross section converging inwardly forming a substantially V-shaped groove and said floating ring having a complementary V-shaped side surface.

7. The apparatus set forth in claim 6 wherein said stacked members are permanent magnets.

8. The apparatus set forth in claim 7 wherein said permanent magnets are held in stacked relation by removable clips.

9. The apparatus set forth in claim 8 wherein one of said permanent magnets may possess greater magnetism than the other to position the floating ring in a predetermined position.

10. The apparatus set forth in claim 6 wherein said stacked members are electromagnets.

11. The apparatus set forth in claim 10 wherein said electromagnets are connected by a hinge having a horizontal axis.

12. The apparatus set forth in claim 11 wherein said electromagnets are adjustable to vary the position of the floating ring within the fixed ring.

13. A method of assembling a magnetic ring used in the spinning of a textile yarn in an apparatus having a driven bobbin and a traversing ring rail for distributing yarn thereon comprising the steps of:
    positioning a floating permanent magnetic ring centrally about said bobbin beneath which yarn is fed to said bobbin;
    carrying said floating ring centrally in a fixed ring on said ring rail;
    encompassing said floating ring by providing said fixed ring with a portion extending above and below said floating ring and with a lower extension projecting inwardly beneath a surface of said floating ring; and
    supplying a repulsive magnetic force with respect to said floating ring, maintaining said floating ring centrally above said lower extension;
    whereby twist is supplied to the yarn passing between said floating ring and said fixed ring and then beneath a bottom surface of said floating ring for distribution upon said bobbin.

14. The method set forth in claim 13 including providing said floating ring with respective outer and inner surfaces of opposite polarities and said lower extension of said fixed ring with an inner polarity similar to the adjacent portion of outer polarity of said floating ring causing the floating ring to be centered within the fixed ring.

* * * * *